United States Patent
Björkman et al.

(10) Patent No.: US 11,840,236 B2
(45) Date of Patent: Dec. 12, 2023

(54) METHOD, COMPUTER PROGRAM, COMPUTER-READABLE MEDIUM, CONTROL ARRANGEMENT AND A VEHICLE FOR DOWNSHIFTING GEARS IN AN UPHILL SLOPE

(71) Applicant: Scania CV AB, Södertälje (SE)

(72) Inventors: Anders Björkman, Mariefred (SE); Richard Boström, Nykvarn (SE); Frank Mohr, Värmdö (SE); Marcus Engman, Årsta (SE); Afram Kourie, Södertälje (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 17/912,386

(22) PCT Filed: Mar. 12, 2021

(86) PCT No.: PCT/SE2021/050219
§ 371 (c)(1),
(2) Date: Sep. 16, 2022

(87) PCT Pub. No.: WO2021/194405
PCT Pub. Date: Sep. 30, 2021

(65) Prior Publication Data
US 2023/0127657 A1    Apr. 27, 2023

(30) Foreign Application Priority Data

Mar. 25, 2020  (SE) .................................... 2050325-6

(51) Int. Cl.
*B60W 10/02* (2006.01)
*B60W 30/188* (2012.01)
(Continued)

(52) U.S. Cl.
CPC ........ *B60W 30/1884* (2013.01); *B60W 10/02* (2013.01); *B60W 10/10* (2013.01);
(Continued)

(58) Field of Classification Search
CPC .. B60W 30/1884; B60W 10/02; B60W 10/10; B60W 10/184; B60W 30/18181;
(Continued)

(56) References Cited

U.S. PATENT DOCUMENTS

| | | |
|---|---|---|
| 4,916,979 A | 4/1990 | Irwin |
| 5,361,207 A | 11/1994 | Hayafune |

(Continued)

FOREIGN PATENT DOCUMENTS

| | | | |
|---|---|---|---|
| EP | 2789881 A2 | | 10/2014 |
| JP | H05263921 A | * | 10/1993 |
| SE | 539389 C2 | | 9/2017 |

OTHER PUBLICATIONS

Scania CV AB, International Patent Application No. PCT/SE2021/050219, International Preliminary Report on Patentability, dated Sep. 22, 2022.

(Continued)

*Primary Examiner* — Roger L Pang
(74) *Attorney, Agent, or Firm* — Moore & Van Allen PLLC; W. Kevin Ransom

(57) ABSTRACT

A method in a control arrangement of a vehicle and a control arrangement for a vehicle for downshifting gears in an uphill slope are presented. The method comprises, when the vehicle is travelling in an uphill slope using an initial gear of the vehicle's automated manual transmission gearbox: simulating at least one speed profile for a downshift to, and a usage of, at least one gear; determining that a minimal speed of each one of the at least one simulated speed profile has a value indicating that the actual speed of the vehicle (Continued)

will be less than or equal to zero in the uphill slope; opening a clutch before is reduced to a value less than zero; activating at least one vehicle brake; shifting vehicle's automated manual transmission gearbox to a start gear; closing the clutch; and deactivating the at least one vehicle brake.

14 Claims, 5 Drawing Sheets

(51) Int. Cl.
| | |
|---|---|
| *B60W 10/10* | (2012.01) |
| *B60W 10/184* | (2012.01) |
| *B60W 30/18* | (2012.01) |
| *B60W 30/19* | (2012.01) |
| *F16H 59/44* | (2006.01) |
| *F16H 59/66* | (2006.01) |
| *F16H 61/02* | (2006.01) |
| *F16H 59/14* | (2006.01) |
| *F16H 59/36* | (2006.01) |

(52) U.S. Cl.
CPC .... *B60W 10/184* (2013.01); *B60W 30/18027* (2013.01); *B60W 30/18118* (2013.01); *B60W 30/18181* (2013.01); *B60W 30/19* (2013.01); *F16H 59/44* (2013.01); *F16H 59/66* (2013.01); *F16H 61/0213* (2013.01); *B60W 2510/0638* (2013.01); *B60W 2510/1005* (2013.01); *B60W 2520/10* (2013.01); *B60W 2552/15* (2020.02); *B60W 2710/021* (2013.01); *B60W 2710/1005* (2013.01); *B60W 2710/18* (2013.01); *F16H 2059/142* (2013.01); *F16H 2059/366* (2013.01); *F16H 2059/663* (2013.01); *F16H 2061/022* (2013.01); *F16H 2061/0234* (2013.01)

(58) Field of Classification Search
CPC ..... B60W 2510/1005; B60W 2520/10; B60W 2552/15; B60W 2710/021; B60W 30/18027; B60W 30/18118; B60W 2710/1005; B60W 2710/18; F16H 2059/142; F16H 2059/663; F16H 59/66; F16H 59/44
USPC ........................ 477/71, 75, 171, 172; 701/53
See application file for complete search history.

(56) References Cited

U.S. PATENT DOCUMENTS

| | | | |
|---|---|---|---|
| 5,692,990 A | 12/1997 | Tsukamoto et al. | |
| 9,151,383 B2 * | 10/2015 | Adams | F16H 59/36 |
| 10,995,853 B2 * | 5/2021 | Ooshima | F16H 61/12 |
| 2008/0064563 A1 | 3/2008 | Kobayashi et al. | |
| 2012/0022753 A1 | 1/2012 | Vandekerkhove | |
| 2013/0172147 A1 | 7/2013 | Razaznejad et al. | |
| 2015/0072831 A1 | 3/2015 | Sakata | |
| 2017/0137029 A1 * | 5/2017 | Dynes | B60W 30/18072 |
| 2019/0176807 A1 * | 6/2019 | Cho | B60K 6/547 |

OTHER PUBLICATIONS

Scania CV AB, International Patent Application No. PCT/SE2021/050219, International Search Report, dated Mar. 31, 2021.
Scania CV AB, International Patent Application No. PCT/SE2021/050219, Written Opinion, dated Mar. 31, 2021.

* cited by examiner

METHOD, COMPUTER PROGRAM, COMPUTER-READABLE MEDIUM, CONTROL ARRANGEMENT AND A VEHICLE FOR DOWNSHIFTING GEARS IN AN UPHILL SLOPE

CROSS-REFERENCE TO RELATED APPLICATIONS

This application is a National Stage Patent Application (filed under 35 § U.S.C. 371) of PCT/SE2021/050219, filed Mar. 12, 2021, of the same title, which, in turn claims priority to Swedish Patent Application No. 2050325-6 filed Mar. 25, 2020, of the same title; the contents of each of which are hereby incorporated by reference.

FIELD OF THE INVENTION

The invention relates to a vehicle and in particular to a method and a control arrangement for downshifting gears of the vehicle in an uphill slope. The invention also relates to a computer program and a computer-readable medium that implement the method according to the invention.

BACKGROUND OF THE INVENTION

The following section constitutes a description of the background to the invention, which does not however necessarily have to constitute prior art.

Modern vehicles are commonly provided with control systems arranged for controlling different functions of the vehicle. Examples of such control systems include gearbox control systems, for example automatic or semi-automatic gearbox control systems arranged for shifting a current used gear and/or are equipped with gear shifting indication systems arranged for indicating to a driver when it is suitable to shift the current used gear and to which gear the shift should be.

In vehicles equipped with such gearbox control systems, e.g. with automated manual transmission gearbox, gear selection, gear shift and clutch operations are performed automatically instead of manually by the driver of the vehicle.

Such systems thus provide a method for controlling the gearbox, which may be based on an algorithm deciding when and how it is suitable to shift the used gear. The method for controlling the gearbox should generally provide gear shifts that result in a lowest possible fuel consumption. The method for controlling the gearbox may also take other parameters into consideration, such as e.g. a requested vehicle speed and a requested engine power/torque. Further, one or more dynamic parameters may also be taken into consideration, such as a current and an upcoming driving situation for the vehicle, e.g. in connection with varying road slopes/gradients.

Other examples of vehicle control systems include systems for controlling different brake systems onboard the vehicle. Such a braking control, based on commands initiated by the vehicle's driver and/or other control units, may be performed by the control system sending control signals to suitable system modules to demand desired braking force from desired brake systems.

SUMMARY OF THE INVENTION

It is an objective of the invention to provide a method and a control arrangement for mitigating or solving drawbacks of conventional solutions. In particular, an objective of the invention is to provide a solution for downshifting gears in an uphill slope.

According to an aspect of the invention, these and further objectives are achieved through a method performed by a control arrangement of a vehicle; the vehicle including:
a driveline arranged for providing a torque $T_{q\_wheel}$ to at least one drive wheel, the driveline including at least one engine, a clutch and at least one automated manual transmission gearbox; and
at least one brake arranged for braking the vehicle; the method including:
simulating, when the vehicle is travelling in an uphill slope using an initial gear $G_{init}$ of the at least one automated manual transmission gearbox, at least one speed profile $v_{sim-1}, v_{sim-2}, \ldots, v_{sim-n}$ for a downshift to, and a usage of, at least one gear $G_{init-1}, G_{init-2}, \ldots, G_{init-n}$ of the at least one automated manual transmission gearbox being lower than the initial gear $G_{init}$ in the uphill slope;
determining that a minimal speed $v_{min\_1}, v_{min\_2}, \ldots v_{min\_n}$ of each one of the at least one simulated speed profile $v_{sim-1}, v_{sim-2}, \ldots, v_{sim-n}$ has a value indicating that the actual speed $v_{act}$ of the vehicle will be less than or equal to zero; $v_{sim-1} \leq 0; v_{sim-2} \leq 0, \ldots, v_{sim-n} \leq 0$; in the uphill slope;
opening the clutch before the actual speed vast of the vehicle is reduced to a value less than zero; $v_{act} < 0$;
activating the at least one brake;
shifting the at least one automated manual transmission gearbox to a start gear $G_{start}$;
closing the clutch; and
deactivating the at least one brake.

Applying the method according to the invention makes it possible for a vehicle traveling in an uphill slope to predict whether a downshift may be implemented without the risk of the vehicle speed becoming too low. Too low vehicle speed might lead to unwanted vehicle behaviour like engine stalling and/or the vehicle rolling backwards. For example, in cases when the vehicle starts rolling backwards it might, due to a steep inclination and/or heavy weight of the vehicle, become difficult to brake the vehicle or take a relatively long time to brake the vehicle to a full stop, which may lead to potentially uncontrollable vehicle movement and dangerous traffic situation. By performing one or several simulations of future speed profiles and considering possible downshift scenarios, the vehicle obtains very good control over the vehicle's speed during and after a downshift. Such simulations may be based on different type of information and be performed in a large number of ways which will be explained further. Based on these simulations, it may be determined if a downshift can be performed safely. In case it is determined that a downshift cannot be performed safely due to the speed becoming too low, the vehicle may be controlled by activating the vehicle brakes to make the vehicle decelerate and by inserting a start gear instead to the intended downshift gear. In this way, the risk of uncontrollable vehicle movement is reduced.

According to an embodiment of the invention, the opening of the clutch is performed according to one in the group of:
opening the clutch when the actual speed $v_{act}$ of the vehicle is between zero and an idling vehicle speed $v_{idl}$; $0 \leq v_{act} \leq v_{idl}$; the idling vehicle speed $v_{idl}$ corresponding to an idling engine speed $\omega_{idl}$ and a gear ratio of the initial gear $G_{init}$;

reducing the torque $T_{q\_wheel}$ being provided to the at least one drive wheel and then opening the clutch.

Before downshifting gear to a start gear $G_{start}$ it is desirable to reduce the engine speed in a fast and controlled way to avoid jerky vehicle movement or vehicle engine stalling. Thus, the vehicle is here controlled in a reliable way such that the risk of engine stalling due to too low speed or jerky vehicle movement due to too high torque is mitigated.

According to an embodiment of the invention, the at least one brake is activated according to one in the group of:
- when the actual speed $v_{act}$ of the vehicle is equal to zero; $v_{act}=0$; and
- when the actual speed $v_{act}$ of the vehicle is smaller than a speed threshold $v_{act\_th}$; $v_{act} < v_{act\_th}$.

Hereby, by activating the at least one brake when the vehicle speed is equal to zero, or within a predetermined speed threshold level, the braking of the vehicle is done in a reliable and efficient way such that the risk of the vehicle rolling backwards is mitigated.

According to an embodiment of the invention, the activating of the at least one brake includes braking the vehicle to a standstill.

Hereby, the risk of the vehicle rollback is avoided, and the gear of the vehicle's gearbox can be shifted to the start gear, which may be done when the vehicle is at standstill.

According to an embodiment of the invention, the start gear $G_{start}$ is one in the group of:
- a lowest gear $G_1$ of the at least one automated manual transmission gearbox; and
- a crawler gear $G_{crawl}$.

Hereby, the vehicle is controlled such that the automated manual transmission gearbox is shifted to a start gear, the start gear being the gear with the highest transition. Depending on the gearbox, the start gear can either be a lowest gear $G_1$ or a crawler gear $G_{crawl}$. Thus, a maximum power is provided by the vehicle engine.

According to an embodiment of the invention, the closing of the clutch and the deactivating of the at least one brake are at least partly synchronized, and result in a drive-off for the vehicle.

By at least partly synchronizing the closing of the clutch and the deactivating of the at least one brake the risk of the vehicle drive-off with activated brake is mitigated. Thus, the wear on the gearbox and on other components in the vehicle is reduced.

According to an embodiment of the invention, the simulating of the at least one speed profile $v_{sim-1}, v_{sim-2}, \ldots, v_{sim-n}$ includes;
- comparing a driving resistance force $F_{res}$ acting on the vehicle in the uphill slope with at least one simulated traction force $F_{trac-1}, F_{trac-2}, \ldots F_{trac-n}$ resulting from the torque $T_{q\_wheel}$ provided to the at least one drive wheel after the downshift for the at least one gear $G_{init\_1}, G_{init-2}, \ldots, G_{init-n}$, respectively.

By comparing the driving resistance force $F_{res}$ acting to retard/decelerate the vehicle with at least one simulated traction force $F_{trac-1}, F_{trac-2}, \ldots F_{trac-n}$ after the gearshift acting to accelerate/propel the vehicle, the total force acting on the vehicle and thus a speed of the vehicle may be determined. Based on the determined speed of the vehicle it may be determined if a downshift can be performed.

According to an embodiment of the invention, the simulating of the at least one speed profile $v_{sim-1}, v_{sim-2}, \ldots, v_{sim-n}$ is based on at least one in the group of:
- at least one vehicle related parameter;
- at least one engine characteristics parameter; and
- at least one timing parameter related to the downshift to at least one gear $G_{init-1}, G_{init-2}, \ldots, G_{init-n}$.

Hereby, the simulation may be based on one or more of a large number of different information/parameters. Thus, an accurate speed profile $v_{sim-1}, v_{sim-2}, \ldots, v_{sim-n}$ may be simulated in any situation, providing a reliable information of vehicle behaviour after a downshift.

According to an embodiment of the invention, the simulating of the at least one speed profile $v_{sim-1}, v_{sim-2}, \ldots, v_{sim-n}$ is based on information associated with the uphill slope.

Hereby, more accurate simulations may be provided.

According to an embodiment of the invention, the information associated with the uphill slope includes one or more of:
- information associated with a position of the vehicle;
- map associated information;
- information associated with one or more features of the uphill slope; and
- information associated with an inclination α of the uphill slope.

Hereby, the simulation may be based on information associated with the uphill slope, which may include various types of information, such as topology of the uphill slope, as will be explained further. Thus, a simulation method is provided where the at least one speed profile $v_{sim-1}, v_{sim-2}, \ldots, v_{sim-n}$ can be more accurately simulated for any topographical aspect.

According to an embodiment of the invention, before the simulating of the at least one speed profile $v_{sim-1}, v_{sim-2}, \ldots, v_{sim-n}$:
- determining that the initial gear $G_{init}$ has a gear ratio such that the at least one engine is unable to drive the vehicle in the uphill slope using the initial gear $G_{init}$; and
- determining that a downshift to a lower gear $G_{init-1}, G_{init-2}, \ldots, G_{init-n}$ should be performed.

Thus, it is here determined that the engine power is not high enough to propel the vehicle in the uphill slope when the initial gear $G_{init}$ is used and hence engine stalling and/or backwards rolling of the vehicle can be mitigated or avoided.

According to an aspect of the invention, a control arrangement for a vehicle is provided. The vehicle includes:
- a driveline arranged for providing a torque $T_{q\_wheel}$ to at least one drive wheel, the driveline including at least one engine, a clutch and at least one automated manual transmission gearbox; and
- at least one brake arranged for braking the vehicle;

the control arrangement being configured for:
- simulating, when the vehicle is travelling in an uphill slope using an initial gear $G_{init}$ of the at least one automated manual transmission gearbox, at least one speed profile $v_{sim-1}, v_{sim-2}, \ldots, v_{sim-n}$ for a downshift to, and a usage of, at least one gear $G_{init-1}, G_{init-2}, \ldots, G_{init-n}$ of the at least one automated manual transmission gearbox being lower than the initial gear $G_{init}$ in the uphill slope;
- determining that a minimal speed $v_{min\_1}, v_{min\_2}, \ldots v_{min\_n}$ of each one of the at least one simulated speed profile $v_{sim-1}, v_{sim-2}, \ldots, v_{sim-n}$ has a value indicating that the actual speed $v_{act}$ of the vehicle will be less than or equal to zero; $v_{sim-1} \leq 0; v_{sim-2} \leq 0, \ldots, v_{sim-n} \leq 0$; in the uphill slope;
- opening the clutch before the actual speed vast of the vehicle is reduced to a value less than zero; $v_{act} < 0$;
- activating the at least one brake;
- shifting the at least one automated manual transmission gearbox to a start gear $G_{start}$;
- closing the clutch; and
- deactivating the at least one brake.

According to an aspect of the invention, a vehicle including the herein disclosed control arrangement is provided.

It will be appreciated that all the embodiments described for the method aspects of the invention are applicable also to the control arrangement aspect of the invention. Thus, all the embodiments described for the method aspect of the invention may be performed by the control arrangement, which may also be a control device, i.e. a device. The control arrangement and its embodiments have advantages corresponding to the advantages mentioned above for the method and its embodiments.

According to an aspect of the invention, a computer program and a computer-readable medium are provided. The computer program and the computer-readable medium comprise instructions which, when executed by a computer, cause the computer to carry out the method disclosed herein.

BRIEF LIST OF FIGURES

Embodiments of the invention will be illustrated in more detail below, along with the enclosed drawings, where similar references are used for similar parts, and where:

Figure 4:
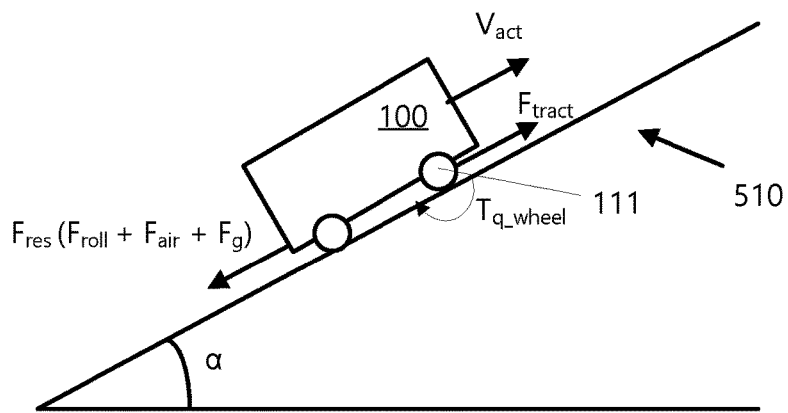
Figure 5:
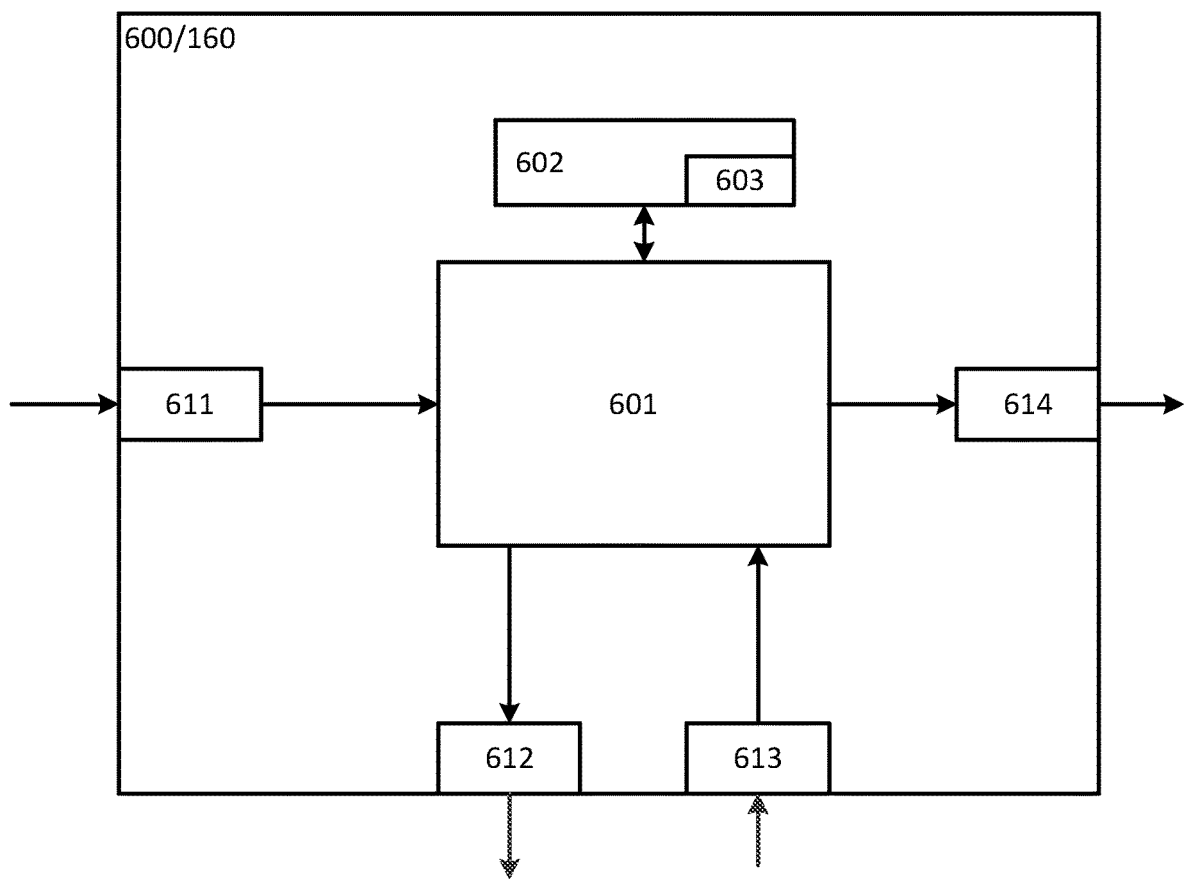

FIG. 4 schematically illustrates a vehicle travelling in an uphill slope with forces acting on the vehicle; and FIG. 5 shows an embodiment of a control arrangement according to an embodiment of the invention.

DETAILED DESCRIPTION

Providing a method for automatic control of the gear shifting such that the vehicle performs in accordance with the requests of the driver and/or cruise control systems with lowest possible fuel consumption and acceptable exhaust emissions may be challenging. This is e.g. due to the fact that some of the parameters that should be taken into consideration when controlling the gear shifting counteract each other. Currently, engine efficiency and the requests of the driver and/or cruise control systems are often used as basis for automatic gear shifting control decisions. However, to base the gear shifting control on the engine efficiency and on requests of the driver and/or cruise control systems may, in some specific situations, lead to non-optimal gear shifting decisions, e.g. when gear shifting is done in an uphill slope.

When a vehicle travelling in an uphill slope is being decelerated due to the engine not being able to keep the speed at the current gear, a gear downshift may become necessary to increase the engine power and re-accelerate the vehicle by increasing the traction force acting on the vehicle in the driving direction obtained from the engine of the vehicle via the driving wheels. However, since a gear shift takes time to accomplish, it will lead to a further decrease in vehicle speed. In the case when the time for performing the gear shifting is not sufficient due to the initial speed of the vehicle and the inclination of the slope, the vehicle may start rolling backwards leading to potentially dangerous situations.

Figure 1A:
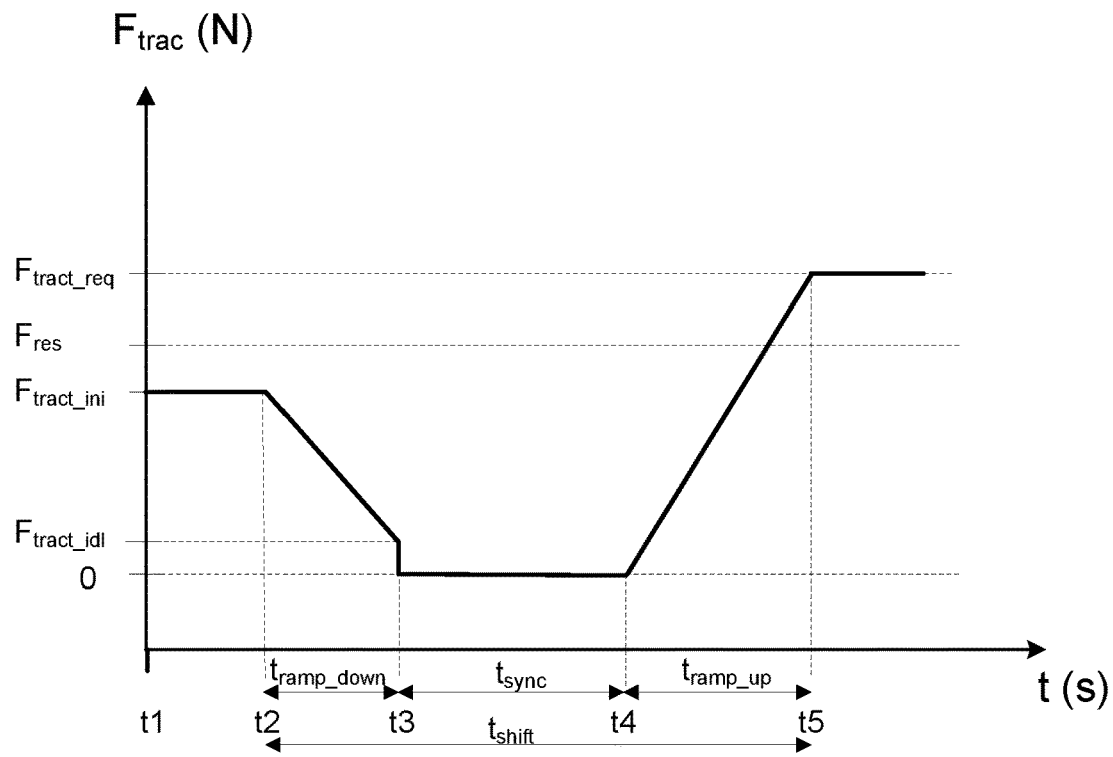
FIG. 1a is a graph schematically illustrating a traction force acting on a vehicle driving in an uphill slope during a gear downshift.
Figure 1B:
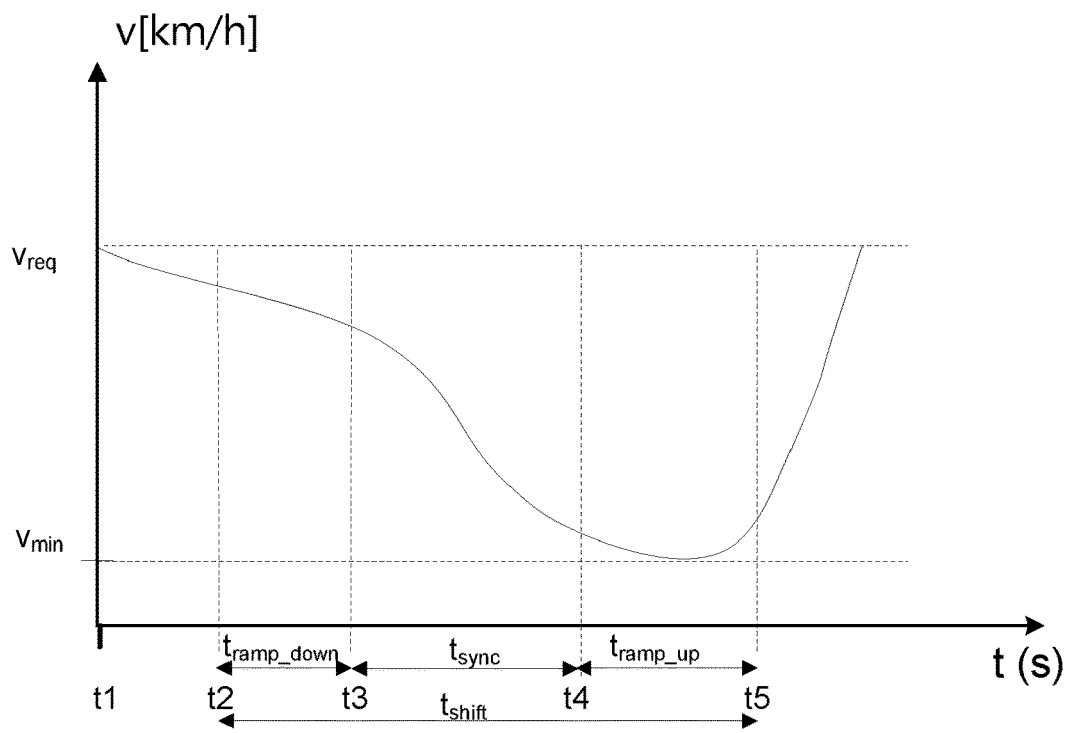
FIG. 1b is a graph schematically illustrating a speed of a vehicle driving in uphill slope before and during a gear downshift.

FIGS. 1a and 1b schematically illustrate a forward driving traction force obtained from an engine of a vehicle via driving wheels and vehicle speed during a successful gear downshift from an initial gear $G_{init}$ to a lower gear when the vehicle is travelling in an uphill slope. FIG. 1a shows a simplified illustration of the forward driving traction acting on the vehicle as a function of time during a gear downshift while FIG. 1b shows a simplified illustration of the corresponding speed of the vehicle as a function of time during the gear downshift.

During a time period between a time instance t1 and a time instance t2, an initial traction force $F_{tract\_ini}$ is acting on the vehicle, as illustrated in FIG. 1a, when the vehicle is driving with an initial gear $G_{init}$. The vehicle is also exposed to a driving resistance force $F_{res}$ acting to retard/decelerate the vehicle which, during this time period, is larger than the propulsive traction force $F_{tract\_ini}$ acting on the vehicle. The vehicle is thus being decelerated as shown in FIG. 1b. Since the vehicle cannot maintain a required speed $v_{req}$, a gear downshift is necessary to increase the engine power, such that the propulsive traction force $F_{tract}$ is increased above the value of the driving resistance force $F_{res}$, where the traction force equals the driving resistance force $F_{res}$, and the vehicle can be re-accelerated.

At the time instance t2, a gear downshift from the initial gear $G_{init}$ to a lower gear is initiated. During the time period $t_{ramp\_down}$ between the time instance t2 and a time instance t3, the torque provided from the vehicle's engine to the at least one drive wheel of the vehicle is ramped down before opening a vehicle clutch to avoid jerky vehicle movement. Thus, the traction force $F_{tract}$ acting on the vehicle is reduced from the initial traction force level $F_{tract\_ini}$ to a lower level $F_{tract\_idl}$ as shown in FIG. 1a. The level of $F_{tract\_idl}$ may e.g. correspond to an idling engine speed for the initial gear $G_{init}$. During this time period, the vehicle speed may continue to decrease, as shown in FIG. 1b.

Between the time instance t3 and a time instance t4, the downshift is conducted by opening/disengaging the clutch, shifting the initial gear $G_{init}$ to a neutral gear, shifting the neutral gear to a lower gear and finally closing/engaging the clutch. During this time period $t_{sync}$ no torque is obtained from the engine and thus no traction force $F_{tract}$ is acting on the vehicle. During time period $t_{sync}$, when the clutch is disengaged, the vehicle decelerates further as shown in FIG. 1b due to the forces acting on the vehicle in the uphill slope.

During the time period $t_{ramp\_up}$ between the time instance t4 and a time instance t5, the driver requests an engine torque by use of the accelerator pedal after which the torque provided by the engine is increased leading to an increased traction force acting on the vehicle to finally, at the time instance t5, reach a traction force level $F_{tract\text{-}req}$ corresponding to the driver requested engine torque, as shown in FIG. 1a. During this time period $t_{ramp\_up}$ when the traction force increases above the value of the driving resistance force $F_{res}$, the vehicle may start to accelerate as shown in FIG. 1b.

At the time instance t5 the traction force emitted by a vehicle's engine via the driving wheels corresponds to a requested engine torque and thus the downshift has been completed.

At some time instance during the downshift period $t_{shift}$ or after the downshift has been completed, the vehicle reaches a lowest speed $v_{min}$ which in the example illustrated in FIG. 1b occurs between the time instances t4 and t5, when the traction force reaches a level larger than $F_{res}$. However, the speed can reach its minimum at any time instance during or after the downshift period $t_{shift}$. If the lowest speed during or after the downshift $v_{min}$ reaches 0 km/h or below, the vehicle, when being in the uphill slope, will move backwards, which might lead to potentially dangerous situations.

Figure 2:
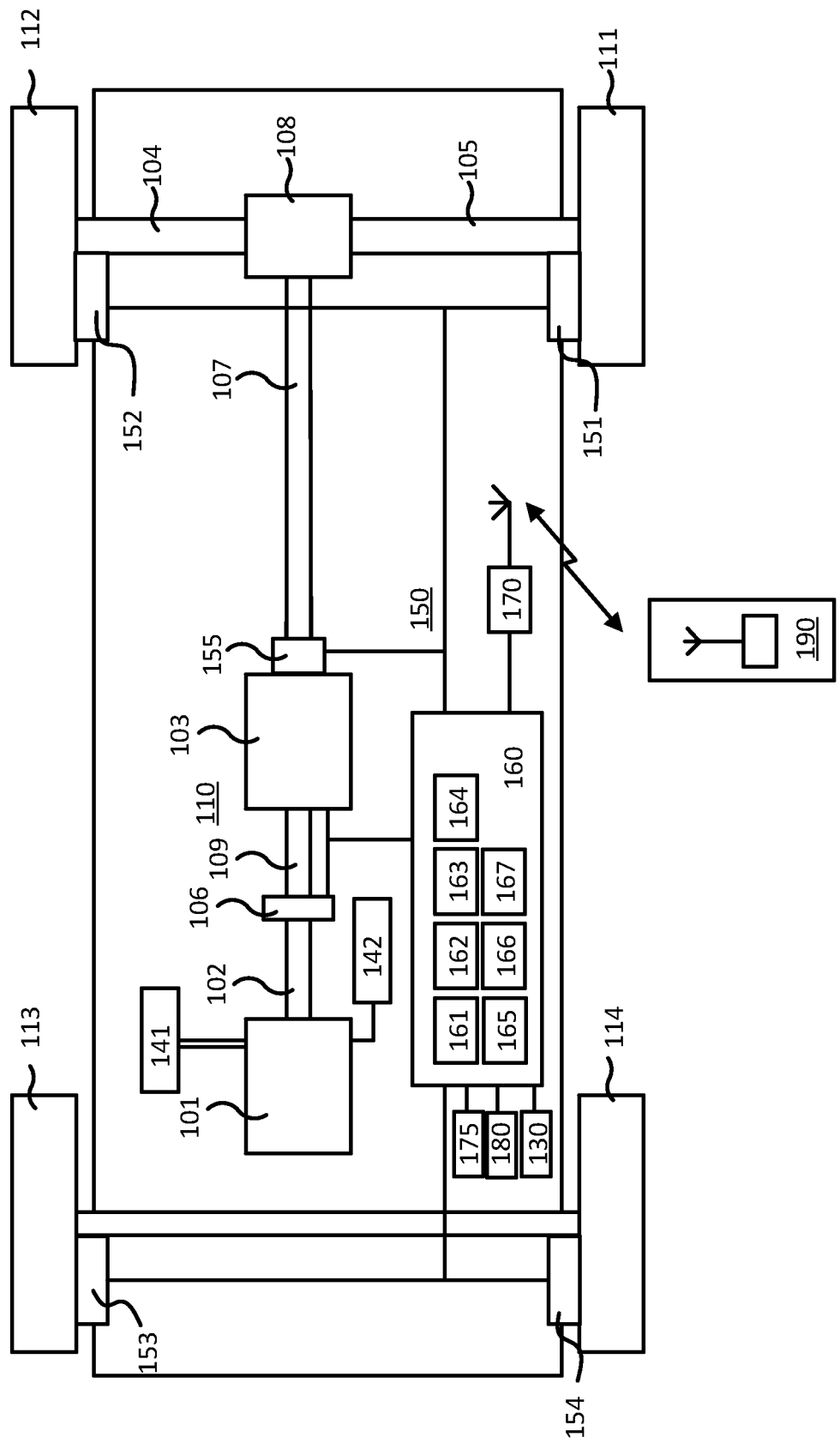
FIG. 2 shows an example vehicle in which embodiments of the invention may be implemented.

FIG. 2 schematically shows an exemplary heavy vehicle 100, such as a truck carrying a heavy cargo/load, which will be used to explain the herein presented embodiments of the invention. However, the embodiments are not limited to use in vehicles such as the ones shown in FIG. 2, but may be used in any suitable vehicle, such as lighter vehicles, e.g. smaller trucks and cars.

The vehicle 100 in FIG. 2, comprises a first of drive wheels 111, 112 and at least one second pair of wheels 113, 114. The vehicle 100 furthermore comprises a driveline/drivetrain/powertrain 110 configured to transfer a torque between at least one power source 101, such as e.g. an engine, and the drive wheels 111, 112. The at least one power source 101 may include a combustion engine, at least one electrical machine, or a combination of these, implementing a so-called hybrid drive. The at least one power source 101 may, when being a combustion engine, be provided with fuel from a fuel tank 141 coupled to the at least one power source. The power source 101 may also be provided with electrical energy by at least one battery 142 coupled to the at least one power source.

The at least one power source 101 is for example in a customary fashion, via an output shaft 102 of the engine 101, connected to a clutch 106, and via the clutch also to a gearbox 103 which may be an automated manual transmission gearbox. The torque provided by the engine 101 is provided to an input shaft 109 of the gearbox 103. A propeller shaft 107, connected to an output shaft of the gearbox 103, drives the drive wheels 111, 112 via a final gear 108, such as e.g. a customary differential, and drive shafts 104, 105 connected with the final gear 108. Also, one or more electrical machine may be arranged essentially anywhere along the driveline 110, as long as torque is provided to one or more of the wheels 111, 112, 113, 114, e.g. adjacent to one or more of the wheels 111, 112, 113, 114, as is understood by a skilled person.

The vehicle 100 also may include at least one braking arrangement 151, 152, 153, 154, for example one braking arrangement 151, 152, 153, 154 arranged at each one of the wheels of the vehicle 100. The at least one braking arrangement 151, 152, 153, 154 may be included in at least one braking system 150. Braking of the vehicle 100, which may result in a retardation of the vehicle 100, by use of the at least one braking arrangement 151, 152, 153, 154 may be achieved in a number of well-known ways. The at least one braking system 150 may also include one or more additional braking devices 155, for example one or more additional braking devices acting on the driveline 110, such as a retarder, and/or an exhaust brake device. The at least one braking system 150, including the at least one braking arrangement 151, 152, 153, 154 and/or the at least one additional braking device 155 may be controlled by at least one control arrangement 160, which is described more in detail below.

The control arrangement 160 may be implemented on single control unit/device or physical entity or distributed in two or more separate control units/devices or physical entities. For example, the control arrangement 160, may be distributed on several control units configured to control different parts of the vehicle 100. The control arrangement 160 may e.g. include a simulation unit 161, a determination unit 162, an opening unit 163, an activation unit 164, shifting unit 165, a closing unit 166 and a deactivation unit 167 arranged for performing the method steps of the disclosed invention as is explained further on. The control arrangement 160 and/or another control unit/device may further be configured for controlling one or more of the at least one power source 101, the clutch 106, the gearbox 103, and/or any other units/devices/entities of the vehicle. However, in FIG. 2, only the units/devices/entities of the vehicle 100 useful for understanding the invention are illustrated.

The vehicle 100 may further include one or more sensors 175, e.g. at least one camera and/or at least one pressure sensor, located at suitable positions within the vehicle 100.

Further, the vehicle 100 may comprise a positioning system/unit 180. The positioning unit 180 may be based on a satellite navigation system such as the Navigation Signal Timing and Ranging (Naystar), Global Positioning System (GPS), Differential GPS (DGPS), Galileo, GLONASS, or the like. Thus, the positioning unit 180 may comprise a GPS receiver.

The vehicle 100 may also include at least one input device 130 arranged for receiving an input from the driver, as is described more in detail below. The at least one input device may include at least one button, at least one knob, at least one lever, at least one touch screen, or any other suitable input device.

The vehicle 100 may further include at least one communication device 170 arranged for communication with at least one entity 190 external to the vehicle 100, such as e.g. an infrastructure entity, a communication entity of another vehicle and/or a positioning information entity.

According to an embodiment of the invention, the at least one communication device 170 may be essentially any device transferring information to and/or from the vehicle 100, and the at least one entity 190 external to the vehicle 100 may be essentially any external entity communicating with the vehicle, i.e. with the at least one communication device 170, for the transfer of the information to and/or from the vehicle. Thus, the at least one external entity 190 may e.g. be associated with, such as being included in, an infrastructure entity and/or another vehicle. Correspondingly, as mentioned above, the at least one communication device 170 may be a vehicle-to-vehicle (V2V) communication device, a vehicle-to-infrastructure (V2I) communication device, and/or a vehicle-to-everything (V2X) communication device, such that communication between the vehicle 100 and the at least one external entity 190 is achieved/provided.

Figure 3A:
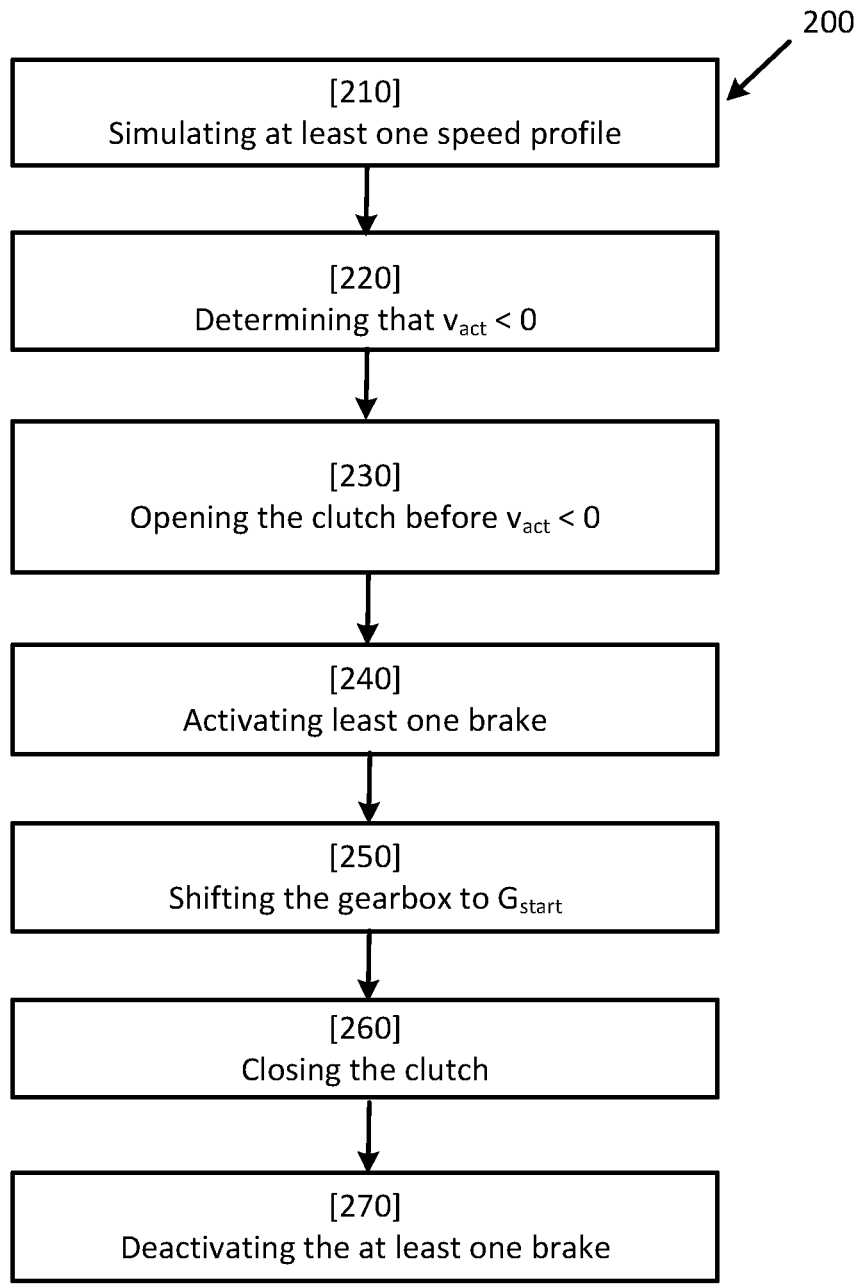
FIG. 3a shows a method for a control arrangement of vehicle according to an embodiment of the invention.

FIG. 3a shows a flow chart of an embodiment of a method 200 performed by a control arrangement 160 of a vehicle 100, e.g. such as the vehicle disclosed in FIG. 2, for driving in an uphill slope 510, i.e. in an ascending road section.

As previously mentioned with reference to FIG. 2, the vehicle 100 includes a driveline 110, arranged for providing a torque $T_{q\_wheel}$ to at least one drive wheel 111, 112, the driveline 110 including at least one engine 101, a clutch 106 and at least one automated manual transmission gearbox 103. Moreover, the vehicle 100 includes at least one brake 151, 152, 153, 154, 155 arranged for braking the vehicle 100. The at least one brake may comprise one or more of at least one service brake 151, 152, 153, 154, at least one auxiliary brake 155, at least one parking brake 151, 152, 153, 154.

The method 200 may be executed when the vehicle 100 is travelling in an uphill slope 510 using an initial gear $G_{init}$ of the at least one automated manual transmission gearbox 103 and an initial speed of $v_{act\text{-}init}$. The initial gear $G_{init}$ can be any gear of the automated manual transmission gearbox 103.

In step 210, at least one speed profile $v_{sim\text{-}1}$, $v_{sim\text{-}2}$, ..., $v_{sim\text{-}n}$ is simulated, for example with the use of the simulation unit 161 described above. The at least one speed profile $v_{sim\text{-}1}$, $v_{sim\text{-}2}$, ..., $v_{sim\text{-}n}$ being for a downshift to, and a usage of, at least one gear $G_{init\text{-}1}$, $G_{init\text{-}2}$, ..., $G_{init\text{-}n}$ of the at least one automated manual transmission gearbox 103 being lower than the initial gear $G_{init}$ in the uphill slope 510.

In step 220, it is determined that a minimum speed $v_{min\_1}$, $v_{min\_2}$, ..., $v_{min\_n}$, i.e. the lowest speed value, of each one of the at least one simulated speed profile $v_{sim\text{-}1}$, $v_{sim\text{-}2}$, ..., $v_{sim\text{-}n}$ has a value indicating that the actual speed vast for the vehicle 100 will be less than or equal to zero $v_{sim\text{-}1} \leq 0$; $v_{sim\text{-}2} \leq 0$, ..., $v_{sim\text{-}n} \leq 0$ in the uphill slope 510.

In step 230, the clutch 106 is opened, before the actual speed of the vehicle $v_{act}$ is reduced to a value less than zero km/h.

In step 240, the at least one brake 151, 152, 153, 154, 155 is activated.

In step 250, the at least one automated manual transmission gearbox 103 is shifted to a start gear $G_{start}$.

In step 260, the clutch 106 is closed.

In step 270, the at least one brake 151, 152, 153, 154, 155 is deactivated completing the gearshift.

By simulating the at least one speed profile $v_{sim\text{-}1}$, $v_{sim\text{-}2}$, ..., $v_{sim\text{-}n}$ of the vehicle 100 in step 210 a speed profile, i.e. speed variations, of the vehicle 100 during the downshift phase $t_{shift}$ may be determined when downshifting to at least one lower gear. By determining that each of the at least one speed profile $v_{sim\text{-}1}$, $v_{sim\text{-}2}$, ..., $v_{sim\text{-}n}$ will reach a minimum speed, less than or equal to zero, in step 220 it is determined that a downshift in the uphill slope 510 may lead to too low vehicle speed during or after the downshift phase $t_{shift}$. However, if a downshift is not performed the engine 101 might lose power which might lead to engine stalling. On the other hand, a downshift may, due to the low actual speed of the vehicle 100, lead to backward moving of the vehicle 100 due to the driving resistance force $F_{res}$ acting to retard/decelerate the vehicle 100 in the uphill slope 510. By controlling the vehicle 100 according to method of the invention, when determined that a downshift in uphill slope may lead to too low vehicle speed, according to steps 210-270, a controlled and reliable downshift is achieved, avoiding unexpected and unwanted potentially dangerous vehicle behavior and leading to increased safety for the vehicle itself and its owner and persons and objects behind the vehicle.

Figure 3B:
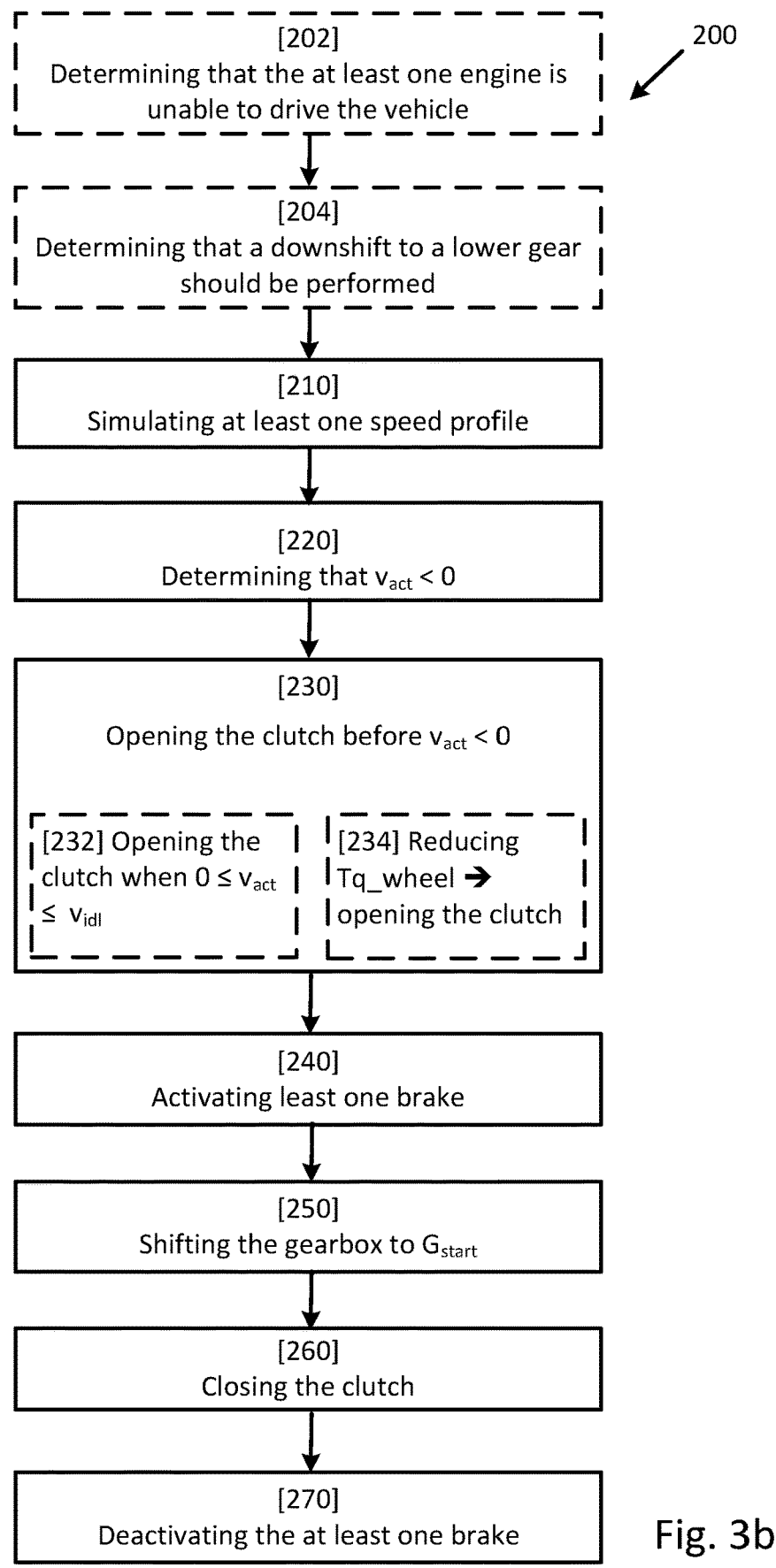
FIG. 3b shows a method for a control arrangement of vehicle according to an embodiment of the invention.

In addition to the above described method steps 210-270, the method 200 may in an embodiment, comprise a number of optional steps. FIG. 3b shows a flow chart of method 200 according to an embodiment of the invention.

It should be noted that the method steps illustrated in FIG. 3b and described herein do not necessarily have to be executed in the order illustrated in FIG. 3b. The steps may essentially be executed in any suitable order, as long as the physical requirements and the information needed to execute each method step is available when the step is executed.

In an optional step 202, preceding the previously described step 210, it is in an embodiment determined that an initial gear $G_{init}$ of the at least one automated manual transmission gearbox 103, used by the vehicle 100 travelling in an uphill slope 510, has a gear ratio such that the at least one engine 101 is unable to drive the vehicle 100 in the uphill slope 510 using the initial gear $G_{init}$. Thus, it is here determined that the engine power is not high enough to propel the vehicle 100 in the uphill slope 510 when the initial gear $G_{init}$ is used.

In an optional step 204, it is, in an embodiment, determined that a downshift to a lower gear $G_{init\text{-}1}$, $G_{init\text{-}2}$, ..., $G_{init\text{-}n}$ should be performed.

The determining 204 may, for example, be based on one or more threshold values. The determining 204 may, according to one example, be based on a speed threshold value $v_{th}$, such that when the speed of the vehicle $v_{act}$ at a maximum engine speed when the initial gear $G_{init}$ is used, drops below the speed threshold value $v_{th}$, it is determined that a downshift to a lower gear should be performed. The determining may, according to another example, be based on a torque threshold value $T_{th}$, such that when the torque $T_{q\_wheel}$ provided to the at least one drive wheel 111, 112 of the vehicle 100 at a maximum engine speed when the initial gear $G_{init}$ is used drops below the torque threshold value $T_{th}$, it is determined that a downshift to a lower gear should be performed. According to yet another example, the determining may be based on an engine speed threshold value $\omega_{th}$, such that when the maximum engine speed of the vehicle 100 when the initial gear $G_{init}$ is used drops below the engine speed threshold value $\omega_{th}$, it is determined that a downshift to a lower gear should be performed.

In step 210, as previously described, at least one speed profile $v_{sim\text{-}1}$, $v_{sim\text{-}2}$, ..., $v_{sim\text{-}n}$ is simulated. The simulation may be, for example, performed by means of the previously described simulation unit 161.

The simulation of the at least one speed profile may be here carried out when the vehicle 100 is travelling using an initial gear $G_{init}$ of the at least one automated manual transmission gearbox 103. The simulation may be carried out for at least one downshift step i.e. for a downshift to, and a usage of, at least one gear $G_{init\text{-}1}$, $G_{init\text{-}2}$, ..., $G_{init\text{-}n}$ of the at least one automated manual transmission gearbox 103 being lower than the initial gear $G_{init}$. In a non-limiting example, a simulation may be carried out for all downshift steps i.e. for $G_{init\text{-}1}$, $G_{init\text{-}2}$, ..., $G_{init\text{-}n}$ where $G_{init\text{-}n}$ is the start gear $G_{start}$. In another non-limiting example, in order to limit the load on the simulation unit 161, the simulation may be carried out for downshift steps that are reasonably possible when the simulation is performed. In a non-limiting example, the reasonably possible downshift steps may be determined by a decision logic and be based e.g. on an engine working area of the vehicle 100. The vehicle's working area corresponds to a possible engine speed range for each gear the vehicle 100 may be driven. The engine speed range is generally between an idling engine speed $\omega_{idl}$, e.g. 500 Rotations Per Minute (RPM) up to a maximum engine speed, e.g. 4500 RPM. Thereby, when the vehicle 100 is driving at an actual speed, e.g. 60 km/h, only a few gears of the gearbox are reasonably possible in order to keep the engine speed within its speed range. If any of the gear shift steps is outside the engine's speed range given the vehicle's traveling speed, the shift step is not possible and needs not to be considered during the simulation. Such decision logic may be e.g. implemented by means of the control arrangement 160 of the vehicle 100. In a non-limiting example, speed profile simulations for the at least one of the possible downshift steps during and after a downshift may be carried out in the vehicle 100 with a predetermined frequency, such as for example several times per second.

Speed profile simulations may be performed in a large number of ways, that are all included in the scope of the invention. For example, the simulated speed profile, according to an exemplifying embodiment may be performed based on various types of information.

According to an embodiment, the simulating 210 of the at least one speed profile $v_{sim-1}, v_{sim-2}, \ldots, v_{sim-n}$ may include comparing driving resistance force $F_{res}$ acting on the vehicle 100 in the uphill slope 510 with at least one simulated traction force $F_{trac-1}, F_{trac-2}, \ldots F_{trac-n}$ resulting from the torque $T_{q\_wheel}$ provided to the at least one drive wheel 111, 112 after the downshift for the at least one gear $G_{init-1}, G_{init-2}, \ldots, G_{init-n}$, respectively.

A non-limiting example of a driving situation of a vehicle 100 where an embodiment of the invention may be applied is schematically illustrated in FIG. 4.

The vehicle 100 travels with a speed $v_{act}$ in an uphill slope 510 with an inclination $\alpha$.

The vehicle 100, is exposed to a resistance force $F_{res}$ acting backwards i.e. acting to decelerate the vehicle and a forward traction force $F_{tract}$, i.e. acting to accelerate the vehicle or at least propel the vehicle at a constant speed. The forward traction force results from the torque $T_{q\_wheel}$ provided by the vehicle's engine to the at least one drive wheel 111, 112 and depends on which gear is used, the final gear ratio and the radius of the at least one drive wheel 111, 112.

When the vehicle 100 travels up or down a slope, its weight produces a component called grading resistance $F_g$, which is always directed in the downhill direction. Moreover, the vehicle 100 travelling at a particular speed encounters other forces resisting its motion i.e. forces counteracting the vehicle's movement like air resistance $F_{air}$ and other rolling forces $F_{roll}$ due to rolling resistance, engine and gearbox friction, etc. Thus, for the vehicle 100 travelling in the uphill slope 510 with a speed $v_{act}$, the resistance force $F_{res}$ acting backwards will comprise the grading resistance force $F_g$ as well as the air resistance $F_{air}$ and the rolling forces $F_{roll}$.

For the vehicle 100 in FIG. 4, an energy relationship may be set up for the driving situation. The backward and forward forces $F_{res}$ and $F_{tract}$ will affect the speed of the vehicle 100. By comparing the traction force $F_{trac}$ and the resistance force $F_{res}$ acting on the vehicle 100 a speed profile of the vehicle can be simulated. When the vehicle 100 is travelling at a constant speed the traction force $F_{trac}$ is equal to the resistance force $F_{res}$, $F_{trac}-F_{res}=0$. When the traction force $F_{trac}$ is larger than the resistance force $F_{res}$, $F_{trac}-F_{res}>0$ the vehicle accelerates and in similar way, when the traction force $F_{trac}$ is smaller than the resistance force $F_{res}$, $F_{trac}-F_{res}<0$, the vehicle decelerates.

The at least one traction force $F_{trac-1}, F_{trac-2}, \ldots F_{trac-n}$ acting on the vehicle 100 which, as previously described, may be used for simulating of the at least one speed profile $v_{sim-1}, v_{sim-2}, \ldots, v_{sim-n}$, may be for example determined based on the gear ratio for the applied gear and for the final gear and on the radius of the at least one drive wheel 111, 112 using the principles of the dynamics of the vehicle. In similar way, the weight of the vehicle, the air resistance acting on the vehicle 100, the rolling resistance acting on the vehicle 100 and the inclination of the uphill slope may be used to determine the driving resistance force $F_{res}$ acting on the vehicle 100 in the uphill slope. The increase and decrease of the vehicle speed may be based on the at least one timing parameter related to the downshift to at least one gear $G_{init-1}, G_{init-2}, \ldots, G_{init-n}$ and the traction force resulting from the torque $T_{q\_wheel}$ provided to the at least one drive wheel 111, 112 during $t_{ramp\_up}$ and $t_{ramp\_down}$.

In an embodiment, the simulation 210 may be based on at least one vehicle related parameter such as the initial actual speed of the vehicle 100 before the downshift, the initial engine speed of the at least one engine 101 before the downshift, the vehicle weight, the air resistance acting on the vehicle 100, a rolling resistance acting on the vehicle 100, the radius of the at least one drive wheel and/or at least one parameter related to the uphill slope 510, such as the inclination angle of the uphill slope 510.

Furthermore, the simulation may be based on at least one engine characteristics such as a gear ratio in the gearbox and/or the driveline such as the gear ratio for the initial gear $G_{init}$, the gear ratio for each one of the at least one gear $G_{init-1}, G_{init-2}, \ldots, G_{init-n}$ being lower than the initial gear $G_{init}$, and the gear ratio for the final gear, maximum and/or minimum engine torque.

Moreover, the simulation may be based on at least one timing parameter related to the downshift to at least one gear $G_{init-1}, G_{init-2}, \ldots, G_{init-n}$, such as the time period needed to complete a downshift from the initial gear $G_{init}$ to the gear ratio for each one of the at least one gear $G_{init-1}, G_{init-2}, \ldots, G_{init-n}$ being lower than the initial gear $G_{init}$, a time period $t_{ramp\_down}$ for a decrease of a torque $T_{q\_wheel}$ being provided to the at least one drive wheel 111, 112 in connection with the downshift, a time period $t_{ramp\_up}$ for an increase of a torque $T_{q\_wheel}$ being provided to the at least one drive wheel 111, 112 in connection with the downshift and a synchronization time period $t_{sync}$ in connection with the downshift and the traction force resulting from the torque $T_{q\_wheel}$ provided to the at least one drive wheel 111, 112 during $t_{ramp\_up}$ and $t_{ramp\_down}$.

The above-mentioned parameters relevant for simulating 210 the at least one future speed profile of the vehicle 100 may be provided onboard the vehicle 100, e.g. by one or more onboard sensors 175 and/or may be provided to the vehicle 100 by another vehicle, i.e. by V2V communication, and/or by an infrastructure entity, i.e. by V2I communication.

In an embodiment, the simulating 210 of the at least one speed profile $v_{sim-1}, v_{sim-2}, \ldots, v_{sim-n}$ is based on information associated with the uphill slope 510. The information associated may for example be related to a road section ahead of the vehicle.

The information associated with the uphill slope 510, may in an embodiment include information associated with a position of the vehicle 100, map associated information, information associated with one or more features of the uphill slope 510 and/or information associated with an inclination $\alpha$ of the uphill slope.

Generally, the information associated with the uphill slope 510 may be determined based on information from one or more sensors 175 which may be included in the vehicle 100 e.g. one or more camera, one or more radar equipment and/or a positioning system/unit, such as GPS. Moreover, the information associated with the uphill slope 510 may be provided by another vehicle, i.e. by V2V communication, and/or by an infrastructure entity, i.e. by V2I communication, be obtained based on radar information, on camera information, on positioning information stored previously in the vehicle 100 and, on information obtained from traffic systems related to the road section.

For example, information associated with a position of the vehicle 100 may be provided by a positioning system in the vehicle, such as by GPS. Map associated information e.g, from digital maps may, for example include topology information of an electronic map. Typically, positioning information may be used for positioning the vehicle 100 on the correct location of a digital map, whereby information associated with one or more features of the uphill slope 510, may easily be determined/provided based on the map. The one or more features of the uphill slope 510 may comprise, among others, the inclination α and/or a curvature for the uphill slope 510. If map data is not available, the inclination a of the uphill slope 510, may be obtained by way of estimating the inclination experienced by the vehicle 100 at the time of simulation, e.g. based on an engine torque in the vehicle, on an acceleration of the vehicle, on an accelerometer, on GPS information, on radar information, on camera information, on information from another vehicle, on positioning-related and road gradient information stored previously in the vehicle, and/or on information obtained from traffic systems related to said road section. In systems where information exchange between vehicles is used, the inclination α estimated by a vehicle 100 may also be provided to other vehicles, either directly or via an intermediate unit, such as a database or similar.

Simulations of the at least one speed profile according to an example may be carried out in the vehicle 100 with a predetermined frequency.

In step 220, it is, as previously described, determined that a minimum speed $v_{min\_1}$, $v_{min\_2}$, ... $v_{min\_n}$, i.e. the lowest speed value, of each one of the at least one simulated speed profile $v_{sim-1}$, $v_{sim-2}$, ..., $v_{sim-n}$ has a value indicating that the actual speed $v_{act}$ for the vehicle 100 will be less than or equal to zero $v_{sim-1} \leq 0$; $v_{sim-2} \leq 0$, ..., $v_{sim-n} \leq 0$ in the uphill slope 510.

Hence, it is here determined that all of the at least one simulated speed profiles will reach a minimal speed with a value less than or equal to zero which indicates that none of the simulated gear downshifts can be performed since the actual speed of the vehicle $v_{act}$ will become too low at some point during or after the downshift phase $t_{shift}$ which may lead to the engine 101 stalling, i.e. stop running, and/or the vehicle 100 rolling backwards.

The determination 220 may be executed with the use of the determination unit 162 described above.

In step 230, as described before, the clutch 106 is opened, before the actual speed of the vehicle $v_{act}$ is reduced to a value less than zero km/h. When the clutch 106 is opened, or disengaged, no torque $T_{q\_wheel}$ is transferred from the engine 101 to the automated manual transmission gearbox 103 and by extension to the at least one drive wheel 111, 112. In this uncoupled state, i.e. the open driveline state, it is possible to change gears and/or to stop the vehicle 100 without stopping the engine 101.

In an optional step 232, the clutch 106 may in an embodiment be opened when the actual speed $v_{act}$ of the vehicle 100 is between zero km/h and an idling vehicle speed $v_{idl}$.

Before opening the clutch, it is desirable to reduce the engine speed in a fast and controlled way to avoid jerky vehicle movement or vehicle engine stalling. In a non-limiting example, the engine speed may be reduced, reducing the vehicle speed, to a level corresponding to or below an idling vehicle speed $v_{idl}$ i.e. corresponding to an idling engine speed $\omega_{idl}$ for the gear ratio of the applied gear. However, opening the clutch at a too low speed, i.e. when the vehicle 100 has come to a stop, may result in vehicle engine stalling, i.e. stop moving.

In an embodiment, in an optional step 234, the speed of the vehicle 100 may be reduced by reducing the torque $T_{q\_wheel}$ being provided to the at least one drive wheel 111, 112 before opening the clutch 106.

In step 240, as previously described, the at least one brake 151, 152, 153, 154, 155 is activated. By applying one or more of at least one service brake 151-154 and the at least one auxiliary brake 155, the actual speed $v_{act}$ of the vehicle 100 is controlled to be 0 or close to 0.

In an embodiment, the activating of the at least one brake 151, 152, 153, 154, 155 may be done when the actual speed vast of the vehicle 100 is equal to zero km/h to reduce the risk of the vehicle rolling backwards.

However, it might be difficult to identify the exact moment when the vehicle speed is equal to zero km/h, especially at very low speed. Therefore, in an embodiment the activating of the at least one brake 151, 152, 153, 154, 155 may be done when the actual speed $v_{act}$ of the vehicle is smaller than a speed threshold $v_{act\_th}$.

Generally, the speed threshold value used in the invention, that is to say the maximum actual speed $v_{act}$ at which the vehicle is to be braked by activating the at least one brake 151, 152, 153, 154, 155, may be determined in different ways. For example, it may be related to the actual speed $v_{act}$ of the vehicle at the idling engine speed $\omega_{idl}$ for the initial gear $G_{init}$. A person skilled in the art will obviously realize that vehicle speed and the speed threshold value, which are specified in this disclosure, have equivalents and may be translated into engine speed and engine speed threshold or torque and torque threshold value.

In step 250, the at least one automated manual transmission gearbox 103 is, as previously described, shifted to a start gear $G_{start}$ to initiate a controlled gearshift.

A vehicle's gearbox may be shifted to a start gear $G_{start}$ when the vehicle is at a standstill or is moving with a speed close to 0. Thus, in an embodiment, the activating of the at least one brake 151, 152, 153, 154, 155, performed in step 240, includes braking the vehicle to a standstill.

The start gear $G_{start}$ may, according to an embodiment, be a lowest gear $G_1$ of the at least one automated manual transmission gearbox 103.

A lowest gear of an automated manual transmission gearbox 103 without crawler gears may be gear number one $G_1$. The lowest gear of an automated transmission gearbox 103 with one or more crawler gears may be the first crawler gear $G_{crawl}$. Thus, according to an embodiment, the start gear $G_{start}$ may be a crawler gear $G_{crawl}$.

In step 260, the clutch 106 is, as previously described, closed. In this coupled state, i.e. the closed driveline state, the clutch 106 acts as coupling to transmit power to the automated manual transmission gearbox 103. When the clutch 106 is dosed, or engaged, the engine's 101 torque $T_{q\_wheel}$, requested by the driver of the vehicle 100, is again transferred to the at least one of the drive wheels 111, 112, The driver of the vehicle 100 requests an engine torque by use of an accelerator pedal which may be pressed down during the whole gearshift.

As previously described, in step 270, the at least one brake 151, 152, 153, 154, 155 is deactivated. Hereby, the gearshift is completed, the vehicle 100 is in start gear and the risk of stalling and potentially rolling backwards has been mitigated.

In an embodiment, the closing 260 of the clutch 106 and the deactivating 270 of the at least one brake 151, 152, 153, 154, 155 may be at least partly synchronized, and may result in a drive-off for the vehicle 100.

When the clutch 106 is closing, for example in connection with a gear change of the gear box, the torque provided by the engine, i.e. the engine torque $T_q$, will be provided to the driveline, including the gearbox. The engine and the clutch should preferably be synchronized, such that an increased engine torque $T_q$ is provided to the clutch 106 when it is closing and not before that. Correspondingly, when the clutch 106 is opened, the engine and the clutch 106 should preferably be synchronized, such that a reduced engine torque $T_q$ is provided to the clutch 106 when it is opening, and not before that.

According to an aspect of the invention, a control arrangement 160 of the vehicle 100 is provided.

The control arrangement 160 includes means, for example the simulation unit 161, arranged for simulating 210, when the vehicle 100 is travelling in an uphill slope 510 using an initial gear $G_{init}$ of the at least one automated manual transmission gearbox 103, at least one speed profile $v_{sim-1}$, $v_{sim-2}$, ..., $v_{sim-n}$ for a downshift to, and a usage of, at least one gear $G_{init-1}$, $G_{init-2}$, ..., $G_{init-n}$ of the at least one automated manual transmission gearbox 103 being lower than the initial gear $G_{init}$ in the uphill slope 510.

The control arrangement 160 further includes means, for example the determining unit 162, arranged for determining 220 that a minimal speed $v_{min\_1}$, $v_{min\_2}$, ... $v_{min\_n}$ of each one of the at least one simulated speed profile $v_{sim-1}$, $v_{sim-2}$, ..., $v_{sim-n}$ has a value indicating that the actual speed $v_{act}$ of the vehicle 100 will be less than or equal to zero; $v_{sim-1} \leq 0$; $v_{sim-2} \leq 0$, ..., $v_{sim-n} \leq 0$; in the uphill slope 510.

The control arrangement 160 further includes means, for example the opening unit 163, arranged for opening 230 the clutch 106 before the actual speed $v_{act}$ of the vehicle 100 is reduced to a value less than zero; $v_{act} < 0$.

The control arrangement 160 further includes means, for example the activating unit 164, arranged for activating 240 the at least one brake 151, 152, 153, 154, 155.

The control arrangement 160 further includes means, for example the shifting unit 165, arranged for shifting 250 the at least one automated manual transmission gearbox 103 to a start gear $G_{start}$.

The control arrangement 160 further includes means, for example the closing unit 166, arranged for closing 260 the clutch 106.

The control arrangement 160 further includes means, for example the deactivating unit 167, arranged for deactivating 270 the at least one brake 151, 152, 153, 154, 155.

The control arrangement 160, e.g. a device or a control device, according to the invention may be arranged for performing all of the above, in the claims, and in the herein described embodiments method steps. The control arrangement 160 is hereby provided with the above described advantages for each respective embodiment.

The present invention is also related to a vehicle 100 including the control arrangement 160.

FIG. 5 shows in schematic representation a control arrangement 600/160, which may correspond to or may include one or more of the above-mentioned control units 161-167 i.e. the control units performing the method steps of the disclosed invention. The control arrangement 600/160 comprises a computing/processing unit 601, which can comprise essentially any suitable type of processor or microcomputer, for example a circuit for digital signal processing (Digital Signal Processor, DSP), or a circuit having a predetermined specific function (Application Specific Integrated Circuit, ASIC). The computing unit 601 is connected to a memory unit 602 arranged in the control arrangement 600/160, which memory unit provides the computing/processing unit 601 with, for example, the stored program code and/or the stored data which the computing/processing unit 601 requires to be able to perform computations. The computing unit 601 is also arranged to store partial or final results of computations in the memory unit 602.

In addition, the control arrangement 600/160 is provided with devices 611, 612, 613, 614 for receiving and transmitting input and output signals. These input and output signals can contain waveforms, impulses, or other attributes which, by the devices 611, 613 for the reception of input signals, can be detected as information and can be converted into signals which can be processed by the computing unit 601. These signals are then made available to the computing unit 601. The devices 612, 614 for the transmission of output signals are arranged to convert signals received from the computing/processing unit 601 in order to create output signals by, for example, modulating the signals, which can be transmitted to other parts of and/or systems in the vehicle.

Each of the connections to the devices for receiving and transmitting input and output signals can be constituted by one or more of a cable; a data bus, such as a CAN bus (Controller Area Network bus), a MOST bus (Media Orientated Systems Transport bus), or some other bus configuration; or by a wireless connection. A person skilled in the art will appreciate that the above-stated computer can be constituted by the computing/processing unit 601 and that the above-stated memory can be constituted by the memory unit 602.

Control systems in modern vehicles commonly comprise communication bus systems consisting of one or more communication buses for linking a number of electronic control units (ECU's), or controllers, and various components located on the vehicle. Such a control system can comprise a large number of control units and the responsibility for a specific function can be divided amongst more than one control unit. Vehicles of the shown type thus often comprise significantly more control units than are shown in FIGS. 1 and 6, which is well known to the person skilled in the art within this technical field.

In a shown embodiment, the invention may be implemented by the one or more above mentioned control units 161-167. The invention can also, however, be implemented wholly or partially in one or more other control units already present in the vehicle, or in some control unit dedicated to the invention. The invention may be implemented wholly or partially in computer program code, which when executed by the computing/processing unit 601 (which may be one or more processers as described above, implemented in one or more physical entities) causes the control arrangement to perform the method as described herein.

Here and in this document, units are often described as being arranged for performing steps of the method according to the invention. This also includes that the units are designed to and/or configured to perform these method steps.

The one or more control units 161-167 are in FIG. 2 illustrated as separate units. These units 161-167 may, however, be logically separated but physically implemented in the same unit or can be both logically and physically arranged together. These units 161-167 may for example correspond to groups of instructions, which can be in the form of programming code, that are input into, and are utilized by a processor/computing unit 601 when the units are active and/or are utilized for performing its method step, respectively.

The person skilled in the art will appreciate that a the herein described embodiments for downshifting gears in an uphill slope may also be implemented in a computer program, which, when it is executed in a computer, instructs the computer to execute the method. The computer program is usually constituted by a computer program product 603 stored on a non-transitory/non-volatile digital storage medium, in which the computer program is incorporated in the computer-readable medium of the computer program product. The computer-readable medium comprises a suitable memory, such as, for example: ROM (Read-Only Memory), PROM (Programmable Read-Only Memory), EPROM (Erasable PROM), Flash memory, EEPROM (Electrically Erasable PROM), a hard disk unit, etc.

The invention is not limited to the above described embodiments. Instead, the invention relates to, and encompasses all different embodiments being included within the scope of the independent claims.

The invention claimed is:

1. A method performed by a control arrangement of a vehicle; the vehicle comprising: a driveline arranged for providing a torque $T_{q\_wheel}$ to at least one drive wheel, the driveline comprising at least one engine, a clutch and at least one automated manual transmission gearbox; and at least one brake arranged for braking the vehicle, wherein the method comprising:

simulating, when the vehicle is travelling in an uphill slope using an initial gear $G_{init}$ of the at least one automated manual transmission gearbox, at least one speed profile $v_{sim-1}, v_{sim-2}, \ldots, v_{sim-n}$ for a downshift to, and a usage of, at least one gear $G_{init-1}, G_{init-2}, \ldots, G_{init-n}$ of the at least one automated manual transmission gearbox being lower than the initial gear $G_{init}$ in the uphill slope;

determining that a minimal speed $v_{min\_1}, v_{min\_2}, \ldots v_{min\_n}$ of each one of the at least one simulated speed profile $v_{sim-1}, v_{sim-2}, \ldots, v_{sim-n}$ has a value indicating that an actual speed $v_{act}$ of the vehicle will be less than or equal to zero; $v_{sim-1} \leq 0$; $v_{sim-2} \leq 0, \ldots, v_{sim-n} \leq 0$; in the uphill slope;

opening the clutch before the actual speed $v_{act}$ of the vehicle is reduced to a value less than zero; $v_{act} < 0$;

activating the at least one brake;

shifting the at least one automated manual transmission gearbox to a start gear $G_{start}$;

closing the clutch; and deactivating the at least one brake.

2. A method according to claim 1, wherein the opening of the clutch is performed according to one in the group of:

opening the clutch when the actual speed $v_{act}$ of the vehicle is between zero and an idling vehicle speed $v_{idl}$; $0 \leq v_{act} \leq v_{idl}$; the idling vehicle speed $v_{idl}$ corresponding to an idling engine speed $\omega_{idl}$ and a gear ratio of the initial gear $G_{init}$; and reducing the torque $T_{q\_wheel}$ being provided to the at least one drive wheel and then opening the clutch.

3. A method according to claim 1, wherein the at least one brake is activated according to one in the group of:

when the actual speed $v_{act}$ of the vehicle is equal to zero; $v_{act} = 0$; and when the actual speed $v_{act}$ of the vehicle is smaller than a speed threshold $v_{act\_th}$; $v_{act} < v_{act\_th}$.

4. A method according to claim 1, wherein the activating of the at least one brake comprises braking the vehicle to a standstill.

5. A method according to claim 1, wherein the start gear $G_{start}$ is one in the group of:

a lowest gear $G_1$ of the at least one automated manual transmission gearbox; and a crawler gear $G_{crawl}$.

6. A method according to claim 1, wherein the closing of the clutch and the deactivating of the at least one brake are at least partly synchronized, and result in a drive-off for the vehicle.

7. A method according to claim 1, wherein the simulating of the at least one speed profile $v_{sim-1}, v_{sim-2}, \ldots, v_{sim-n}$ comprises:

comparing a driving resistance force $F_{res}$ acting on the vehicle in the uphill slope with at least one simulated traction force $F_{trac-1}, F_{trac-2}, \ldots F_{trac-n}$ resulting from the torque $T_{q\_wheel}$ provided to the at least one drive wheel after the downshift for the at least one gear $G_{init-1}, G_{init-2}, \ldots, G_{init-n}$, respectively.

8. A method according to claim 1, wherein the simulating of the at least one speed profile $v_{sim-1}, v_{sim-2}, \ldots, v_{sim-n}$ is based on at least one in the group of:

at least one vehicle related parameter;

at least one engine characteristics parameter; and at least one timing parameter related to the downshift to at least one gear $G_{init-1}, G_{init-2}, \ldots, G_{init-n}$.

9. A method according to claim 1, wherein the simulating of the at least one speed profile $v_{sim-1}, v_{sim-2}, \ldots, v_{sim-n}$ is based on information associated with the uphill slope.

10. A method according to claim 9, wherein the information associated with the uphill slope comprises one or more of:

information associated with a position of the vehicle;

map associated information;

information associated with one or more features of the uphill slope; and information associated with an inclination α of the uphill slope.

11. A method according to claim 1, further comprising, before the simulating of the at least one speed profile $v_{sim-1}, v_{sim-2}, \ldots, v_{sim-n}$;

determining that the initial gear $G_{init}$ has a gear ratio such that the at least one engine is unable to drive the vehicle in the uphill slope using the initial gear $G_{init}$; and determining that a downshift to a lower gear $G_{init-1}, G_{init-2}, \ldots, G_{init-n}$ should be performed.

12. A computer program comprising computer program code stored on a non-transitory computer-readable medium, said computer program product used for a method performed by a control arrangement of a vehicle; the vehicle comprising: a driveline arranged for providing a torque $T_{q\_wheel}$ to at least one drive wheel, the driveline comprising at least one engine, a clutch and at least one automated manual transmission gearbox; and at least one brake arranged for braking the vehicle, said computer program code comprising computer instructions to cause one or more control units to perform the following operations:

simulating, when the vehicle is travelling in an uphill slope using an initial gear $G_{init}$ of the at least one automated manual transmission gearbox, at least one speed profile $v_{sim-1}, v_{sim-2}, \ldots, v_{sim-n}$ for a downshift to, and a usage of, at least one gear $G_{init-1}, G_{init-2}, \ldots, G_{init-n}$ of the at least one automated manual transmission gearbox being lower than the initial gear $G_{init}$ in the uphill slope;

determining that a minimal speed $v_{min\_1}, v_{min\_2} \ldots, v_{min\_n}$ of each one of the at least one simulated speed profile $v_{sim-1}, v_{sim-2}, \ldots, v_{sim-n}$ has a value indicating that an actual speed $v_{act}$ of the vehicle will be less than or equal to zero; $v_{sim-1} \leq 0$; $v_{sim-2} \leq 0, \ldots, v_{sim-n} \leq 0$; in the uphill slope;

opening the clutch before the actual speed $v_{act}$ of the vehicle is reduced to a value less than zero; $v_{act} < 0$;

activating the at least one brake;

shifting the at least one automated manual transmission gearbox to a start gear $G_{start}$;

closing the clutch; and deactivating the at least one brake.

13. A control arrangement for a vehicle; the vehicle comprising: a driveline arranged for providing a torque $T_{q\_wheel}$ to at least one drive wheel, the driveline comprising at least one engine, a clutch and at least one automated manual transmission gearbox; and at least one brake arranged for braking the vehicle; the control arrangement being configured for:

- simulating, when the vehicle is travelling in an uphill slope using an initial gear $G_{init}$ of the at least one automated manual transmission gearbox, at least one speed profile $v_{sim-1}$, $v_{sim-2}$, ..., $v_{sim-n}$ for a downshift to, and a usage of, at least one gear $G_{init-1}$, $G_{init-2}$, ..., $G_{init-n}$ of the at least one automated manual transmission gearbox being lower than the initial gear $G_{init}$ in the uphill slope;
- determining that a minimal speed $v_{min\_1}$, $v_{min\_2}$, ... $v_{min\_n}$ of each one of the at least one simulated speed profile $v_{sim-1}$, $v_{sim-2}$, ..., $v_{sim-n}$ has a value indicating that the actual speed $v_{act}$ of the vehicle will be less than or equal to zero; $v_{sim-1} \leq 0$; $v_{sim-2} \leq 0$, ..., $v_{sim-n} \leq 0$; in the uphill slope;
- opening the clutch before the actual speed $v_{act}$ of the vehicle is reduced to a value less than zero; $v_{act} < 0$;
- activating the at least one brake;
- shifting the at least one automated manual transmission gearbox to a start gear $G_{start}$;
- closing the clutch; and
- deactivating the at least one brake.

14. A vehicle comprising a control arrangement for a vehicle; the vehicle comprising: a driveline arranged for providing a torque $T_{q\_wheel}$ to at least one drive wheel, the driveline comprising at least one engine, a clutch and at least one automated manual transmission gearbox; and at least one brake arranged for braking the vehicle; the control arrangement being configured for:

- simulating, when the vehicle is travelling in an uphill slope using an initial gear $G_{init}$ of the at least one automated manual transmission gearbox, at least one speed profile $v_{sim-1}$, $v_{sim-2}$, ..., $v_{sim-n}$ for a downshift to, and a usage of, at least one gear $G_{init-1}$, $G_{init-2}$, ..., $G_{init-n}$ of the at least one automated manual transmission gearbox being lower than the initial gear $G_{init}$ in the uphill slope;
- determining that a minimal speed $v_{min\_1}$, $v_{min\_2}$, ... $v_{min\_n}$ of each one of the at least one simulated speed profile $v_{sim-1}$, $v_{sim-2}$, ..., $v_{sim-n}$ has a value indicating that the actual speed $v_{act}$ of the vehicle will be less than or equal to zero; $v_{sim-1} \leq 0$; $v_{sim-2} \leq 0$, ..., $v_{sim-n} \leq 0$; in the uphill slope;
- opening the clutch before the actual speed $v_{act}$ of the vehicle is reduced to a value less than zero; $v_{act} < 0$;
- activating the at least one brake;
- shifting the at least one automated manual transmission gearbox to a start gear $G_{start}$;
- closing the clutch; and
- deactivating the at least one brake.

* * * * *